(No Model.)
W. R. COLE.
COMBINED HAT AND COAT HANGER AND BUTTON HOOK.
No. 270,889. Patented Jan. 23, 1883.
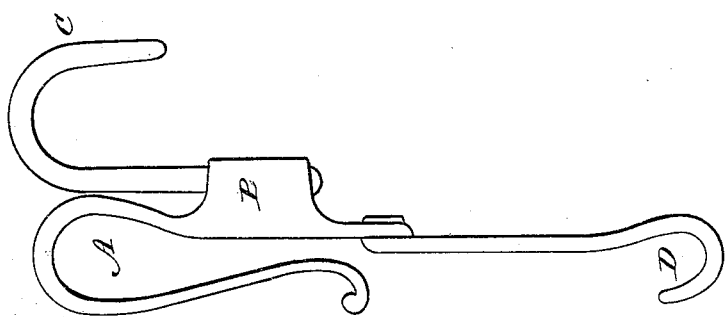
WITNESSES:
C. Neveux
C. Sedgwick
INVENTOR:
W. R. Cole
BY Munn & Co
ATTORNEYS.

UNITED STATES PATENT OFFICE.

WILLIAM R. COLE, OF POTTSVILLE, PENNSYLVANIA.

COMBINED HAT AND COAT HANGER AND BUTTON-HOOK.

SPECIFICATION forming part of Letters Patent No. 270,889, dated January 23, 1883.

Application filed May 17, 1882. (No model.)

*To all whom it may concern:*

Be it known that I, WILLIAM ROBERTS COLE, of Pottsville, in the county of Schuylkill and State of Pennsylvania, have invented a new and Improved Combined Hat and Coat Hanger and Button-Hook, of which the following is a full, clear, and exact description.

The object of my invention is to provide a new and improved combined hat and coat hanger and button-hook which can be folded very compactly, so that it can be conveniently carried in a pocket.

The invention consists in the combination, with a spring-hook adapted to hold a hat, of a hook for holding one or more coats, and also adapted to be used as a button-hook, and of a hook for suspending or hanging the device on a rod-projection or in a recess or aperture, as will be more fully described hereinafter.

Reference is to be had to the accompanying drawings, forming a part of this specification, in which similar letters of reference indicate corresponding parts in all the figures.

Figure 1 is a longitudinal elevation of my improved combined hat and coat hanger and button-hook, showing the same extended or unfolded. Fig. 2 is a longitudinal elevation of the same, showing it folded.

A loop-shaped spring-hook, A, is provided on the outer surface of the fixed or thicker shank with a projection, B, in which a hook, C, is swiveled in such a manner that it can be swung over the top of the spring-hook A, which will then be contained within the hook C, as shown in Fig. 2, the shank of the hook C passing longitudinally through the projection B, and being parallel with the longitudinal axis of the spring-hook A. To the lower end of the fixed or thicker shank of the spring-hook A a hook, D, is pivoted in such a manner that this hook D can be swung within the spring-hook A, as shown in Fig. 2. When the device is not in use the hook D is swung into the spring-hook A, and the hook C is swung over the spring-hook A, so that the hook D is within the hook A, which will be within the hook C. By the spring-tension of the hook A the three hooks will be held in this position, and the device will be folded very compactly. If the device is to be used, the hook C is swung from the hook A, and the hook D is swung downward to hang from the lower end of the fixed or thicker shank of the hook A. The hook C is passed over a rod or into an aperture or on some edge of some article, so that it will be held in position.

One or more coats can be hung on the hook D, and the rim of a hat can be pressed in between the lower end of the spring-shank and the fixed shank of the hook A, and will be held by this spring-hook A. The hook D can also be used as a button-hook.

Having thus described my invention, I claim as new and desire to secure by Letters Patent—

1. The combination, with the spring-hook A, of the hook B, swiveled to one shank of the same, and the hook D, pivoted to the lower end of the same shank, substantially as herein shown and described, and for the purpose set forth.

2. The combination, with the spring-hook A, of the hook C, swiveled in the projection B of one shank of this hook A, and fitting over this hook A, and of the hook D, pivoted to the lower end of the same shank, and fitting within the hook A, substantially as herein shown and described, and for the purpose set forth.

WILLIAM ROBERTS COLE.

Witnesses:
CHAS. H. WÖLTJEN,
A. C. EDMONDS.